No. 622,305. Patented Apr. 4, 1899.
C. H. WEAVER & L. H. HOUGHTON.
FLEXIBLE PIPE JOINT.
(Application filed June 8, 1898.)
(No Model.) 2 Sheets—Sheet 1.
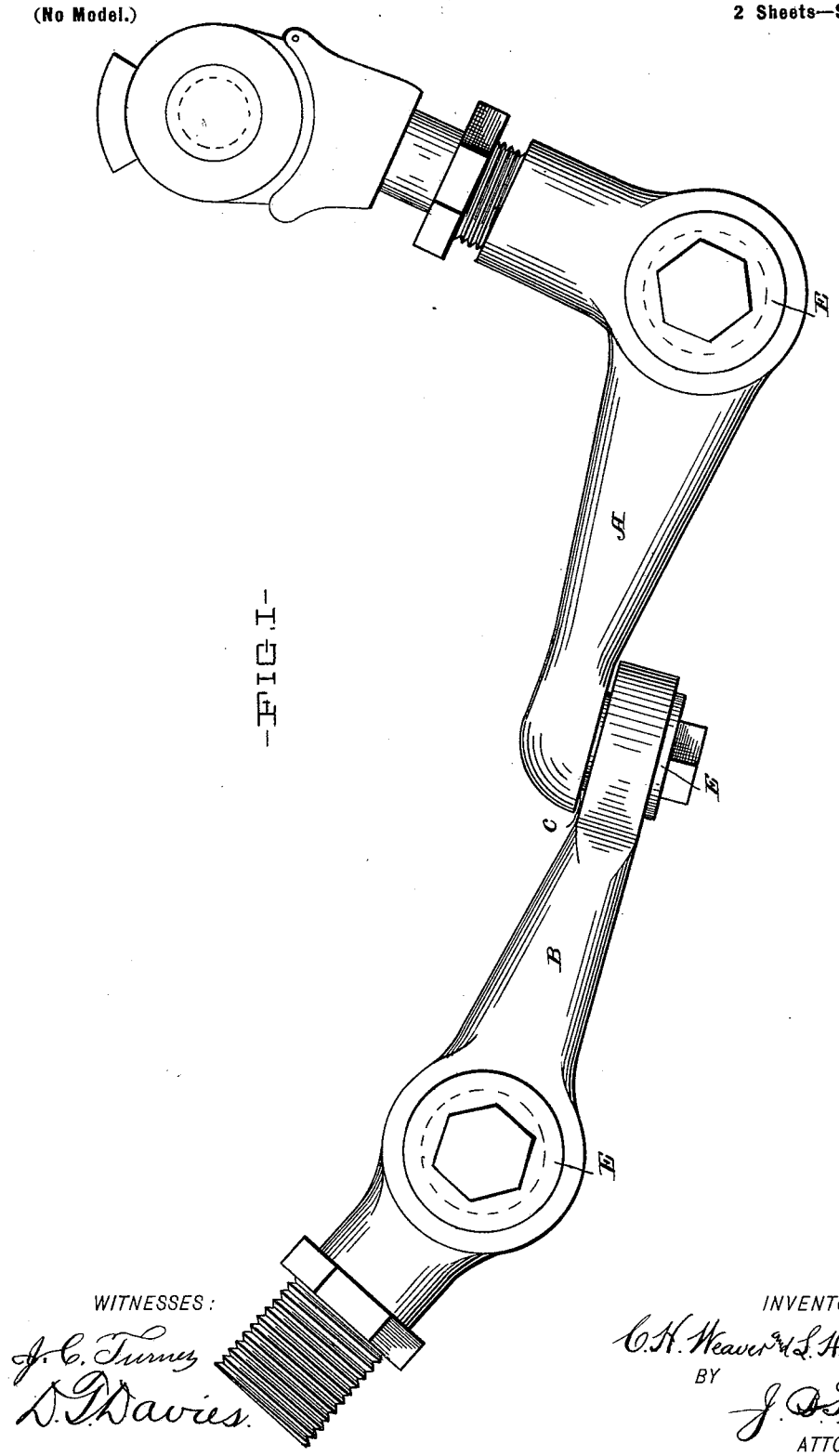
FIG. I.
WITNESSES:
J. C. Turney
D. T. Davies.
INVENTORS
C. H. Weaver & L. H. Houghton
BY
J. D. Fay
ATTORNEY.

No. 622,305. Patented Apr. 4, 1899.
C. H. WEAVER & L. H. HOUGHTON.
FLEXIBLE PIPE JOINT.
(Application filed June 8, 1898.)
(No Model.) 2 Sheets—Sheet 2.
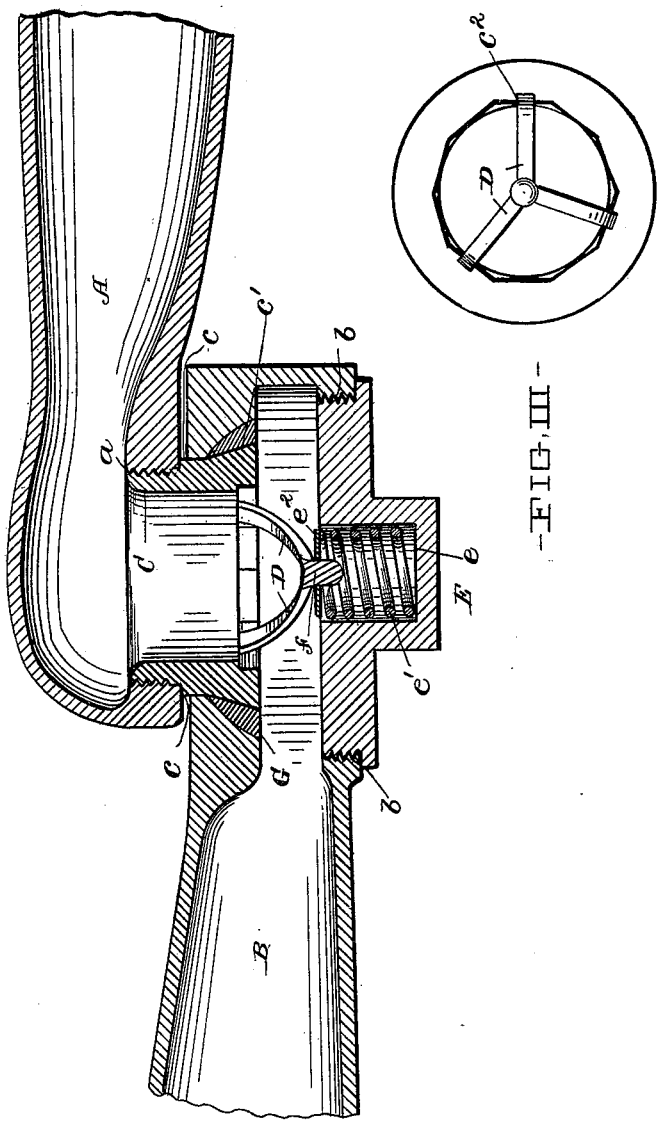
WITNESSES:
J. C. Turner
D. D. Davies
INVENTORS,
C. H. Weaver and L. H. Houghton
BY
J. D. Fay
ATTORNEY.

UNITED STATES PATENT OFFICE.

CHARLES H. WEAVER AND LEMUEL H. HOUGHTON, OF ELKHART, INDIANA, ASSIGNORS OF ONE-FIFTH TO GRANT S. HOUGHTON, OF CHICAGO, ILLINOIS, AND CHARLES J. DONAHUE, OF CLEVELAND, OHIO.

FLEXIBLE PIPE-JOINT.

SPECIFICATION forming part of Letters Patent No. 622,305, dated April 4, 1899.

Application filed June 8, 1898. Serial No. 682,897. (No model.)

*To all whom it may concern:*

Be it known that we, CHARLES H. WEAVER and LEMUEL H. HOUGHTON, citizens of the United States, residents of Elkhart, county of Elkhart, State of Indiana, have invented a new and useful Improvement in Flexible Pipe-Joints, of which the following is a specification, the principle of the invention being herein explained and the best mode in which we have contemplated applying that principle, so as to distinguish it from other inventions.

Our invention relates to flexible pipe-joints, and has for its object an expansible and contractible metallic pipe connection whereby the distance between the termini of the pipe may be varied within reasonable limits and lateral movement of the pipe also had without causing loss of the fluid passing through said pipe.

The annexed drawings and the following description set forth in detail certain mechanism embodying the invention, such disclosed means constituting but one of various mechanical forms in which the principle of the invention may be used.

In said annexed drawings, Figure I is a plan view of several joints of pipes provided with our flexible connections. Fig. II is a central horizontal longitudinal view taken through one joint, and Fig. III is a detail view of the connecting joint and spider.

Metallic couplings or pipes, respectively A and B, may be made of any suitable form. The coupling A is provided with a threaded opening $a$, in which is threaded a connecting-joint C, provided with annular shoulders $c$, that forms a tight joint with the coupling A.

The outer portion $c'$ of said connecting-joint flares outwardly. Spider-seats $c^2$ are formed on the inner portion of said joint, and in said seats are seated the spider D. Coupling B has a threaded opening $b$, in which is threaded a cap E, that is provided with a seat $e$, in which is seated the spiral spring $e'$. A washer $e^2$ is located on the upper portion of said spring and forms a seat for the nipple $f$ of the spider D. A packing-ring G of bevel-seat formation is located intermediate of the coupling B and connecting-joint C.

When it is desired to couple up couplings A and B, the packing-ring G is slipped over the connecting-joint C until it engages with the outwardly-flaring portion $c'$ of said connecting-joint. The connecting-joint is then inserted through the shoulder-opening $b$ of coupling B and is screwed into the opening $a$ of coupling A until the shoulder $c$ engages with said coupling. Spiral spring $E'$ is then seated in the seat $e$ of cap E and the washer $e^2$ slipped over the nipple $f$ of the spider D. The spider is seated in the spider-seats $c^2$ of the connecting-joint and the cap E screwed into the opening $b$ of coupling B until a tight joint is formed.

It will readily be seen that this form of coupling permits easy rotative movement of the two parts of the coupling, and by locating the several joints in planes at right angles to each other the complete pipe may be expanded and contracted longitudinally and free lateral movement of the pipe also had.

Other modes of applying the principle of our invention may be employed instead of the one explained, change being made as regards the mechanism herein disclosed, provided the means covered by any one of the following claims be employed.

We therefore particularly point out and distinctly claim as our invention—

1. In a flexible pipe-joint, the combination of two couplings, a connecting-joint rigid with one coupling, a packing-ring located intermediate of said connecting-joint and second coupling and a pressure device exerting pressure against said connecting-joint and packing-ring, substantially as set forth.

2. In a flexible pipe-joint, the combination of two couplings, a connecting-joint rigid with one coupling and loosely fitting in the second coupling, a packing-ring interposed between said second coupling and connecting-joint, and a spring-pressure device having bearing against said connecting-joint, substantially as set forth.

3. In a flexible pipe-joint, the combination of two couplings, one provided with a connecting-joint, a conical packing-ring interposed between said second coupling and said connecting-joint, and a spring-pressed spider seated in said connecting-joint, substantially as set forth.

4. In a flexible pipe-joint, the combination of two couplings, one of said couplings provided with a connecting-joint having an annular shoulder bearing against said coupling, a screw-cap threaded in said second coupling, carrying a spring and a spider, said spider having bearing against said connecting-joint and a packing-ring interposed between said connecting-joint and second coupling, substantially as set forth.

Signed by us this 6th day of June, 1898.

CHARLES H. WEAVER.
LEMUEL H. HOUGHTON.

Attest:
  J. C. TURNER,
  D. T. DAVIES.